(12) United States Patent
Morgan

(10) Patent No.: US 11,858,620 B2
(45) Date of Patent: Jan. 2, 2024

(54) TILT ROTOR CONTROL

(71) Applicant: Goodrich Actuation Systems Limited, Solihull (GB)

(72) Inventor: Antony Morgan, Wolverhampton (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 387 days.

(21) Appl. No.: 16/665,122

(22) Filed: Oct. 28, 2019

(65) Prior Publication Data

US 2020/0207467 A1 Jul. 2, 2020

(30) Foreign Application Priority Data

Dec. 31, 2018 (EP) ..................................... 18275270

(51) Int. Cl.
| | | |
|---|---|---|
| B64C 27/605 | (2006.01) | |
| B64F 5/60 | (2017.01) | |
| B64C 27/32 | (2006.01) | |
| B64C 27/52 | (2006.01) | |
| B64C 27/57 | (2006.01) | |
| B64C 29/00 | (2006.01) | |
| B64C 27/64 | (2006.01) | |

(52) U.S. Cl.
CPC .......... *B64C 27/605* (2013.01); *B64C 27/322* (2013.01); *B64C 27/52* (2013.01); *B64C 27/57* (2013.01); *B64C 27/64* (2013.01); *B64C 29/0033* (2013.01); *B64F 5/60* (2017.01); *B64D 2221/00* (2013.01)

(58) Field of Classification Search
CPC ..... B64C 27/52; B64C 29/0033; B64C 27/28; B64C 27/605; F03C 1/0686; F03C 1/0697
See application file for complete search history.

(56) References Cited

U.S. PATENT DOCUMENTS

| | | | | |
|---|---|---|---|---|
| 2,018,889 A | * | 10/1935 | Franzen | B64C 29/0033 244/56 |
| 3,514,052 A | * | 5/1970 | McKeown | B64C 29/0033 244/12.3 |
| 5,049,799 A | | 9/1991 | Tsai et al. | |
| 5,554,007 A | | 9/1996 | Watts | |
| 6,247,667 B1 | | 6/2001 | Fenny et al. | |
| 9,068,818 B2 | | 6/2015 | Walker et al. | |
| 9,126,678 B2 | | 9/2015 | Ross et al. | |
| 2004/0232280 A1 | * | 11/2004 | Carter | B64C 27/52 244/17.25 |
| 2004/0261407 A1 | | 12/2004 | Du | |
| 2009/0108129 A1 | | 4/2009 | Flatt | |
| 2018/0274563 A1 | | 9/2018 | Elving | |

FOREIGN PATENT DOCUMENTS

| | | |
|---|---|---|
| DE | 10065367 A1 | 4/2002 |
| JP | 3149031 B2 | 3/2001 |
| WO | 9105698 A1 | 5/1991 |

OTHER PUBLICATIONS

Extended European Search Report for International Application No. 18275270.9 dated May 20, 2019, 10 pages.

* cited by examiner

*Primary Examiner* — Michael H Wang
*Assistant Examiner* — Colin Zohoori
(74) *Attorney, Agent, or Firm* — CANTOR COLBURN LLP

(57) ABSTRACT

A system for driving a tilt rotor between vertical and horizontal using a variable displacement motor controlled in response to a swash angle of the motor measured in a feedback loop.

4 Claims, 4 Drawing Sheets

11,858,620 B2

TILT ROTOR CONTROL

FOREIGN PRIORITY

This application claims priority to European Patent Application No. 18275270.9 filed Dec. 31, 2018, the entire contents of which is incorporated herein by reference.

TECHNICAL FIELD

The present disclosure relates to tilt rotor control systems and particularly drive assemblies for rotating pylons or hubs of tilt rotors between their horizontal 'airplane' mode and their vertical 'helicopter' mode.

BACKGROUND

Some aircraft are provided with tilt rotors which are pivotable such that the rotors make take a vertical or 'helicopter' position or a horizontal or 'airplane' position. Such aircraft usually have a pair of such rotor systems. In the horizontal position, the aircraft operates like a conventional propeller-driven airplane. In the vertical position, the aircraft is able to hover. Here, the terms vertical and horizontal are used to describe the orientation of the rotor hub or pylon. Sometimes the terminology is reversed, with the terms horizontal and vertical describing the plane of rotation of the rotor blades. In the latter case, the 'horizontal' mode is the helicopter or hover mode and the vertical mode is the airplane mode.

A drive mechanism moves the rotor system between the horizontal and vertical positions. This is in many cases a hydraulic drive mechanism, but other drive mechanisms e.g. electric may also be used. The drive mechanism comprises a series of links operated by means of a motor.

During normal flight, the aircraft will operate with the rotor systems in the horizontal or airplane position. For reasons of safety and reliability, it is important for the rotor system to be secured in place in the aircraft position sufficiently to resist counter-forces from the air (airload) and other vibratory forces which are usually high during flight, otherwise, the rotor system could induce aircraft control and structural strength issues To ensure this, the rotor system hubs or pylons are pre-loaded into stops.

Challenges arise in the motor control of the drive mechanism due to the pre-load. Traditionally the motor is designed for high dynamic performance against the maximum loads of both pylons during the transitions from vertical to horizontal operation and vice versa. The challenge with preloading with the traditional systems is that the very high stiffness end stops result in difficulty in achieving controlled end stop loads through this highly dynamic control.

There is, therefore, a need for a more efficient drive mechanism for tilt rotors.

SUMMARY

The present disclosure provides a drive mechanism as defined in claim 1; a tilt rotor system as defined in claim 3 and a method as defined in claim 9.

Preferred embodiments will now be described by way of example only and with reference to the drawings.

DETAILED DESCRIPTION

Figure 1B:
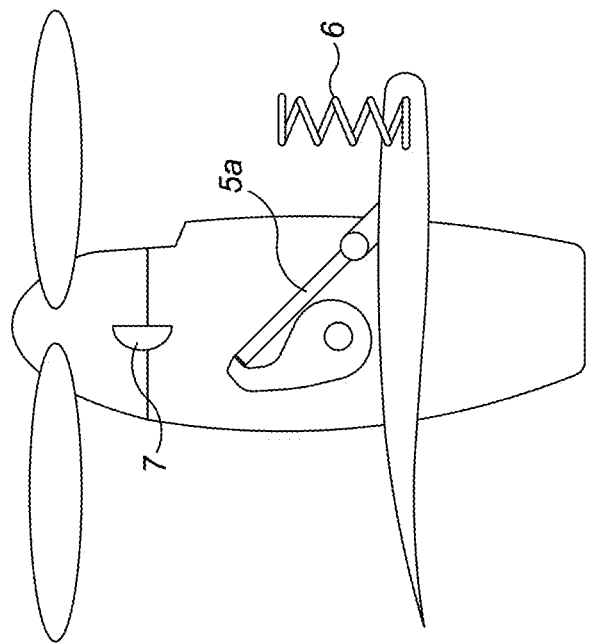
FIG. 1B is a schematic view of a rotor system in the vertical 'helicopter' mode.

A tilt rotor system 10 generally comprises a rotor pylon 1 on which is mounted a hub 2 around which two or more rotor blades 3 are mounted. The blades 3 are fixed to the hub 2 which rotates relative to the pylon 1 during flight to provide a propulsive force or, in the helicopter mode, a lifting force, to move the aircraft. The rotor system is pivotably mounted to a part e.g. a wing (part of which is shown by 4) of the aircraft.

The rotor system is moved between the horizontal (FIG. 1A) and vertical (FIG. 1B) positions by means of a drive mechanism 5 including a series of links driven by a motor (not shown).

To secure the rotor system in the horizontal position (FIG. 1A) a pre-load stop is provided comprising a spring 6 on one of the wing 4 and the rotor system and a mating detent 7 on the other of the rotor system and the wing.

Figure 1A:
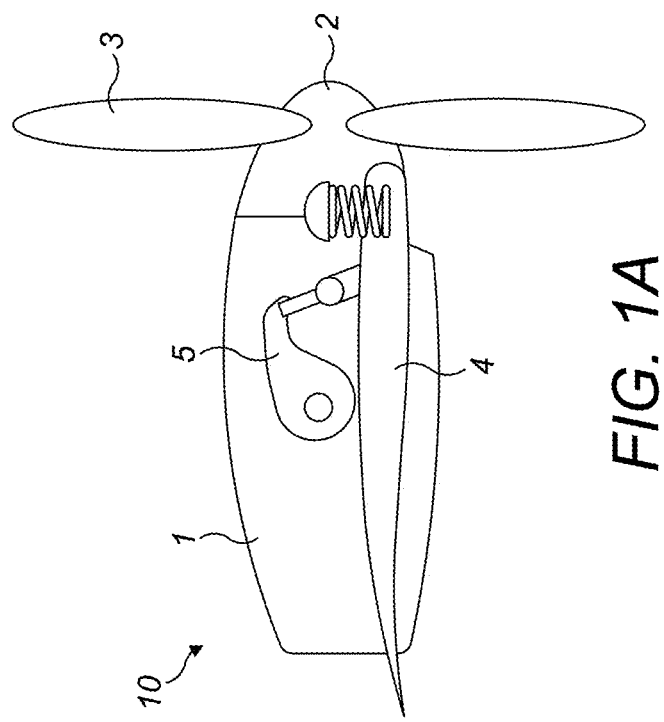
FIG. 1A is a schematic view of a rotor system in the horizontal 'airplane' mode.

In the vertical position as shown in FIG. 1B, a first linear actuator 5a of the drive mechanism is extended. To retract the rotor system to the horizontal position, this actuator is driven by the motor to retract (here to telescope into the position shown in FIG. 1A) bringing the pylon 1 into the horizontal position. As the pylon approaches the end position, the detent 7 will engage the end of the spring 6. Further retraction will cause the spring 7 to compress to its final secure horizontal position.

The motor power required to drive the actuator 5a needs to be sufficiently high to act against the increasing airloads acting against the rotor system as well as the spring force. The springs 6 are usually very stiff.

As the motor size is usually designed to be as small as possible whilst still providing the required power, the motor will run at high speeds. This will result in very high inertia and kinetic energy.

Conventional systems use fixed displacement motors and so provide a constant torque, while the speed is varied. As the pylon comes to the near horizontal position, the loads acting on the pylon are considerably increased. As the pylon comes into contact with the end stop, forces can increase by around 600%. Although force control loops are used to control the load, such control loops suffer from high gain and high hysteresis of the actuation loads of the system. It has been found to be very difficult to control, in particular, the pre-load part of the tilt motion.

Figure 3:
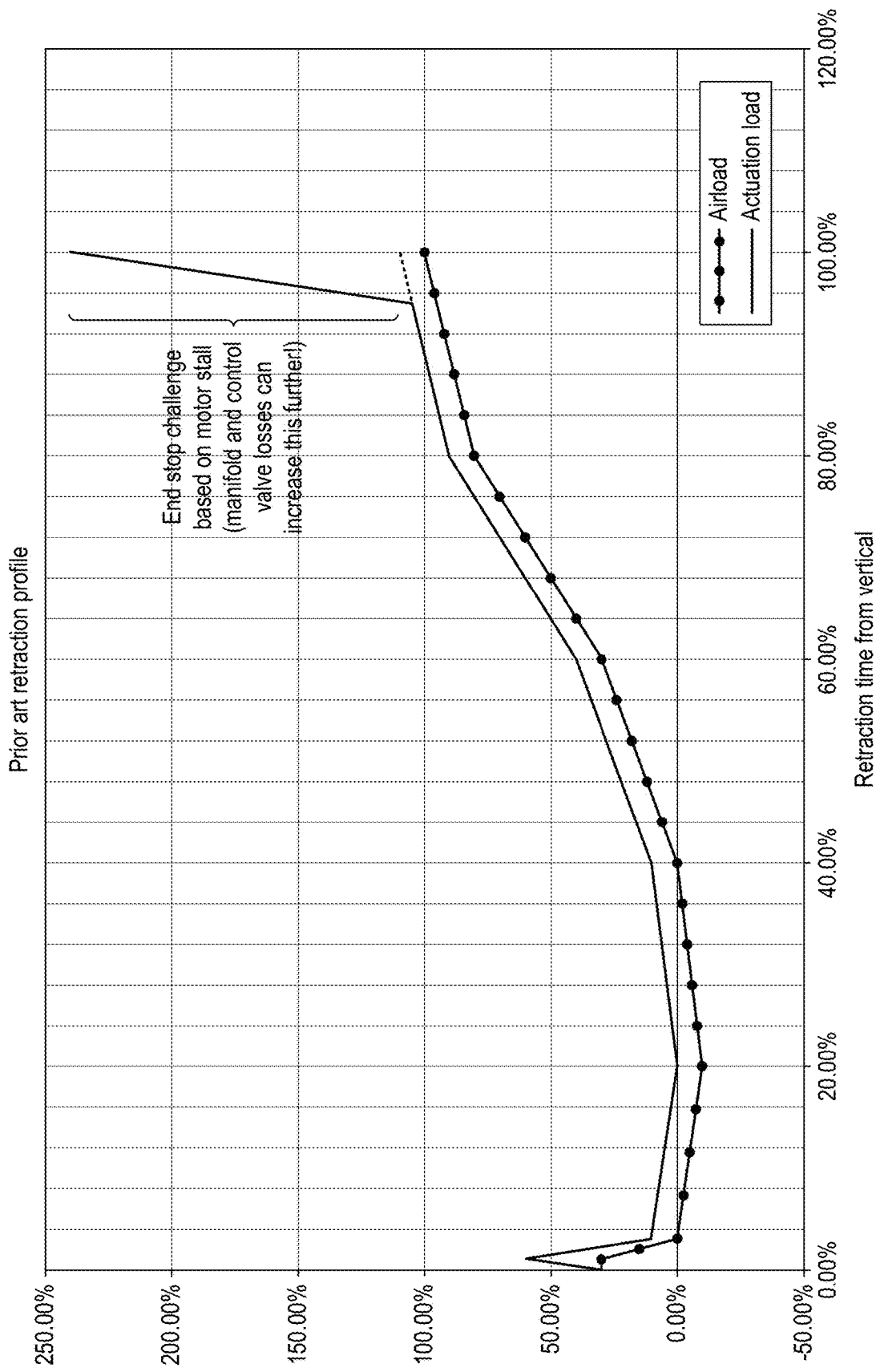
FIG. 3 is a graph showing an example load profile for conventional systems as the rotor retracts from the vertical to the horizontal position.

FIG. 3 shows how the load (airload and actuation (drag) load) varies for a conventional system as the pylon tilts from vertical to horizontal. A relatively high load needs to be overcome initially to release the pylon from the vertical position (known as 'breakout drag'). At the start of the actual pivot motion, the loads are relatively low but increase, initially gradually and then more steeply, as the pylon approaches horizontal (running drag). At almost horizontal, the actuation load increases dramatically due to the end stop which can cause the motor to stall as it is operating too quickly for that load.

Also, as hinted at above, because the motor has to be designed to control both airloads and internal forces and drags and also to allow each system to provide back up in the event of failure of the motor of the other system, the motor is twice as big as it needs to be for most of the operation, which is not efficient.

The system of the present disclosure uses, instead of the conventional fixed displacement hydraulic motors, variable displacement motors which allow for both variable speed and variable torque. The motor swash operates in a speed control loop operating as an automatic load sensor and using the sensed load information to control the operation of the hydraulic actuator 5*a*. This allows the tilt movement to be performed in a more controlled manner.

The speed control loop automatically ensures that the motor provides the required capacity and, thus, torque for any part of the tilt operation so as to balance the loads in the system.

The control is provided by means of an intelligent algorithm that monitors the pylon's rotational position between vertical and horizontal and also monitors the drive motor's swash stroke as the system reaches the horizontal position and where less power is needed, the swash increase will be reduced.

The operation therefore automatically compensates for airload and any prevalent actuation drag. The latter can vary considerably due to temperature.

Figure 4:
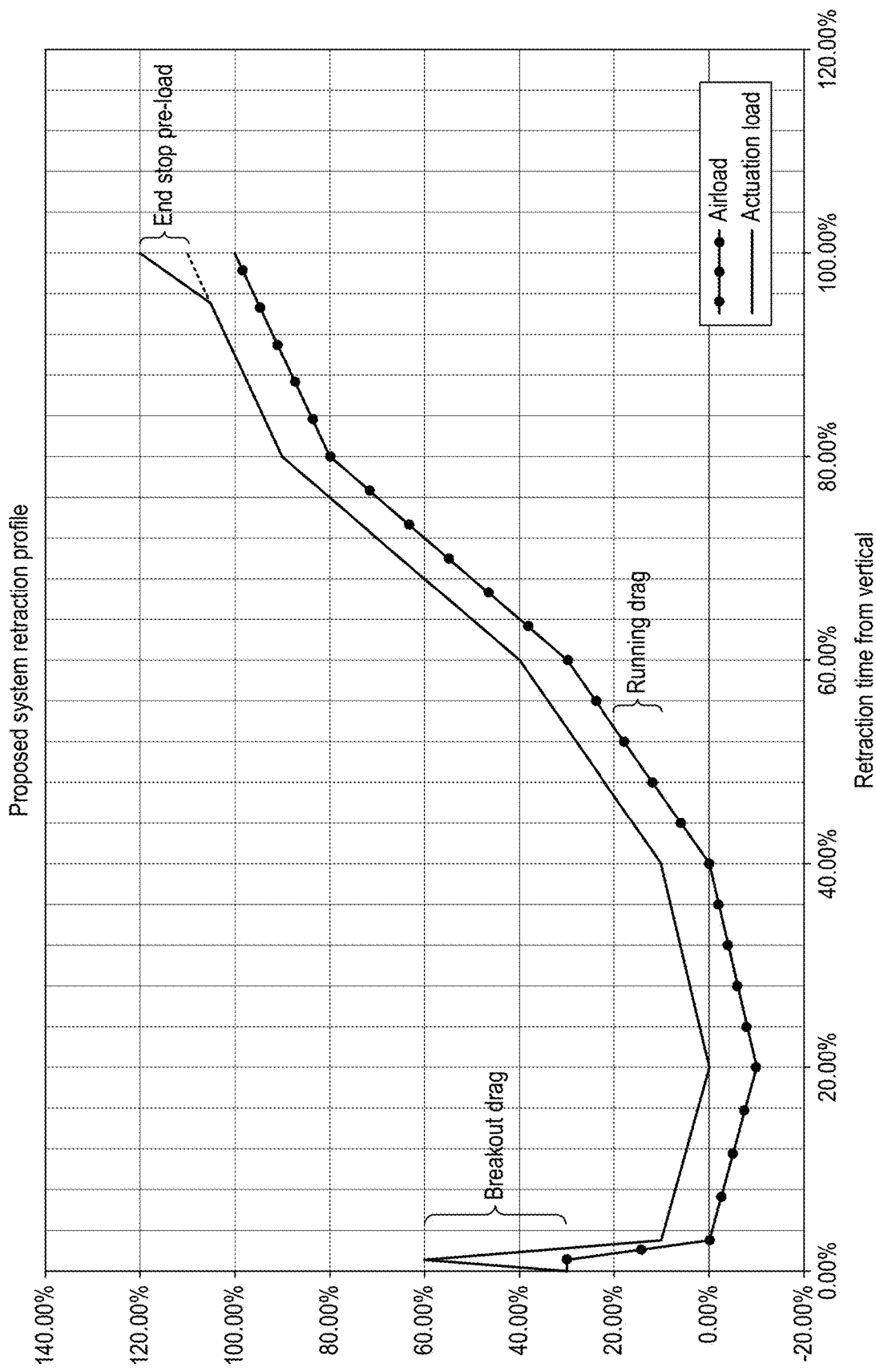
FIG. 4 is a graph showing an example load profile for systems according to this disclosure as the rotor retracts from the vertical to the horizontal position.

The resulting loads over the range of pivotal motion are shown in FIG. 4 where it can be seen, in particular, that the drastic rise in actuation load at the end stop is avoided, thus avoiding stalling of the motor. The motors do not, therefore, need to be designed large enough to provide back-up for each other in the event of stalling.

The algorithm uses the knowledge that the swash of the motor during operation matches the motor shaft torque resulting from the airload and actuation drag. As the system approaches the end stop, the control loop will monitor the change in swash as the speed is reducing due to the added load, and limits the swash change to be within a given range e.g. 10% of the operating load.

Figure 2:
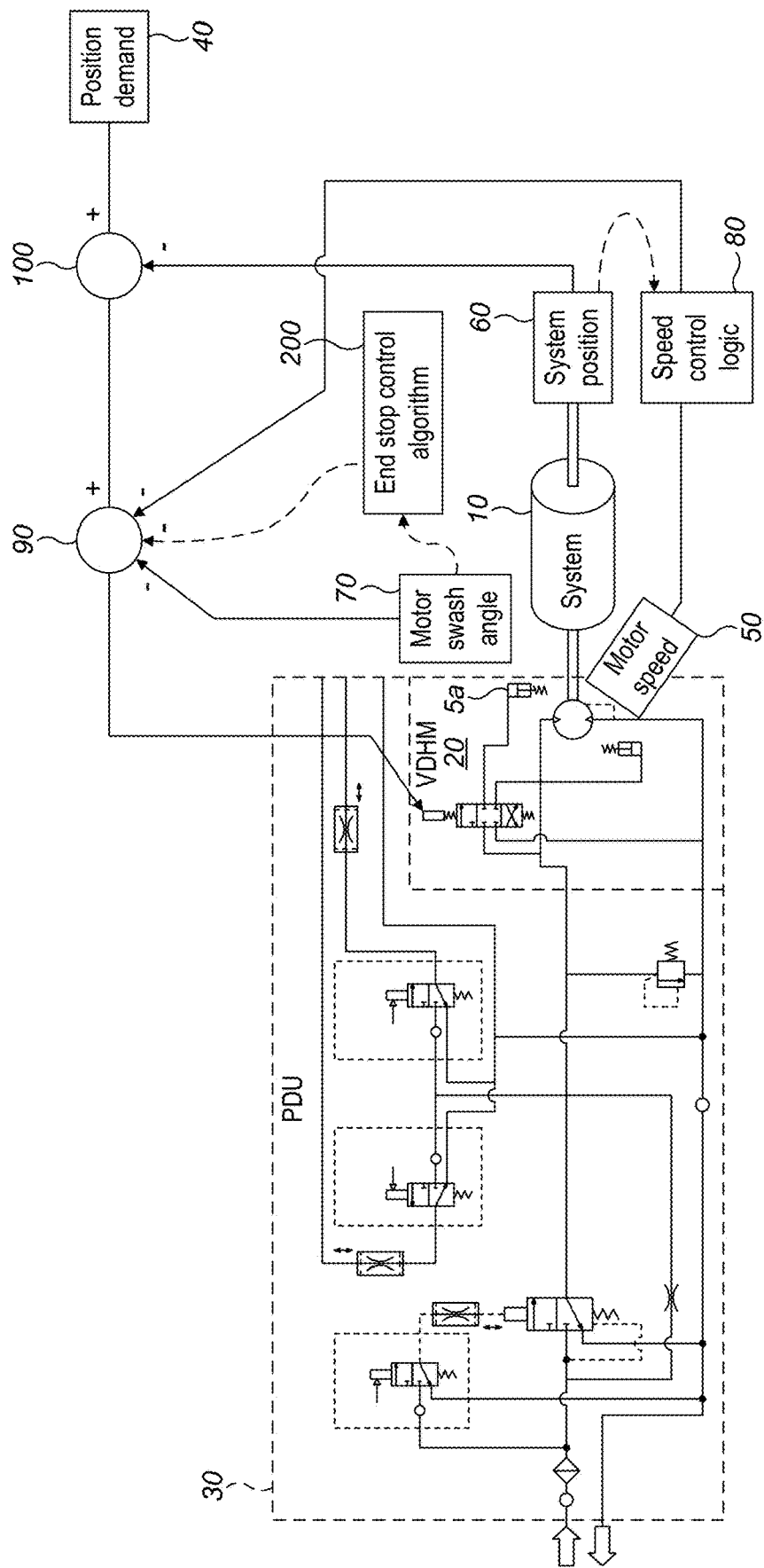
FIG. 2 is a block diagram of the control system according to the disclosure.

The operation of the system of this disclosure will be described in more detail with reference to FIG. 2.

The rotor system 10 is driven by a variable displacement hydraulic motor (VDHM) 20. This is part of a known power distribution unit PDU 30 which will not be described further as this will be well known to a person skilled in the art. Preferably, the VDHM is sized so that a single PDU can drive both pylons of the aircraft. The motor will then be twice the size needed for a single pylon.

A control signal is sent from a control system (not shown) from the cockpit or from the flight control system of the aircraft (not shown) to provide a position demand 40 for the rotor system 10. This is forwarded to the VDHM 20 which, in turn, actuates pivoting of the rotor system 10 to the desired position by driving actuator 5, 5*a*.

Sensors detect motor speed 50, the tilt position 60 of the rotor system and the motor swash angle 70. Conventionally, the system position 60 and motor speed 50 would be used by speed control logic 80 to control the speed of the tilt motion. In short, the position demand will be provided to the drive mechanism. Motor swash increases thereby increasing motor output torque which will accelerate the system. The system will pivot until the desired position is achieved. The speed will be limited or controlled by the speed control logic.

The system, in conventional systems, will be travelling at the pre-set speed until the position sensor 60 indicates that the system has reached a predetermined distance from the end stop, at which time the speed may be reduced to avoid stalling. The kinetic energy of the system will be absorbed by the end stop through strain energy. Even though the speed control results in a reduced kinetic energy, the end stop is very stiff and this provides a high load to the system.

Using the algorithm 200 of the present disclosure the motor swash angle is determined and used to limit the change in swash to a predetermined amount (e.g. 10%). The speed control loop provides a control signal to the VDHM based on the position demand but adjusted for motor speed, the system position, the motor swash angle and the limit to change in swash angle in comparators 90, 100.

Because the algorithm monitors the swash and limits changes in swash which, in turn, limits the increase in system loading, the increase at the end stop will be considerably less than in conventional systems.

The control system of the present disclosure, therefore, provides an improved control of movement of the rotor system taking the loads into account automatically as they occur. The control system provides continuous gauging of the system loads and drags.

The VDHM, by controlling motor swash and, thus, torque gain, can also be used to provide controlled torque during Built-In-Testing of the system and in prognostics such as backlash measurements, measurements of the torsional stiffness of the system. The VDHM can be used to apply precise torque into the system in a static situation such as preloading as described here.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A tilt rotor system for an aircraft, comprising:
   a rotor pylon;
   an actuator connected to the rotor pylon to move the rotor pylon between a first position and a second position, wherein the first position is a vertical position and the second position is a horizontal position;
   a drive mechanism to drive the actuator between the first and second positions, in response to an input command; and
   a stop mechanism to secure the rotor pylon in the second position;
   the drive mechanism comprising:
   a variable displacement motor having sensors for measuring
   a swash angle of the motor,
   speed of the motor, and
   an actual tilt position of the rotor pylon, and
   means for providing feedback control to the variable displacement motor to control the drive power of the motor based on the monitored swash angle, motor speed and actual tilt position of the rotor pylon, and
   wherein the means for providing feedback control includes an algorithm configured to monitor change in swash angle as the motor speed reduces and the actual tilt position of the rotor pylon approaches the second position and, based on the change in the swash angle, the actual tilt position of the rotor pylon, and a reduced power requirement as the system reaches the second position, to limit change in swash angle to be within a predetermined range as a percentage of the operating load.

2. A tilt rotor system as claimed in claim 1, wherein the stop mechanism includes a spring.

3. A tilt rotor system as claimed in claim 1, further comprising a second rotor pylon and a second actuator connected to the second rotor pylon between a first position and a second position by means of the drive mechanism.

4. An aircraft having a tilt rotor system as claimed in claim 3, and input means for providing the input command.

\* \* \* \* \*